United States Patent [19]
Dietz, Jr. et al.

[11] Patent Number: 5,394,503
[45] Date of Patent: Feb. 28, 1995

[54] OPTICAL FIBER CONNECTION MONITORING APPARATUS, PATCH PANEL CONTROL SYSTEM AND METHOD OF USING SAME

[75] Inventors: Frederick Dietz, Jr., Trumbull; Neil Unger, Newtown; James Bateman, New Milford, all of Conn.

[73] Assignee: Data Switch Corporation, Shelton, Conn.

[21] Appl. No.: 196,959

[22] Filed: Feb. 15, 1994

Related U.S. Application Data

[63] Continuation-in-part of Ser. No. 134,073, Oct. 8, 1993, abandoned.

[51] Int. Cl.[6] .......................... G02B 6/36; G02B 6/38
[52] U.S. Cl. ....................... 385/135; 385/24; 385/55; 385/88; 385/89; 385/134; 385/139
[58] Field of Search ................ 385/15, 16, 17, 24, 385/53, 54, 55, 56, 70, 71, 76, 77, 88, 89, 134, 135, 136, 137, 139, 147; 439/577

[56] References Cited

U.S. PATENT DOCUMENTS

| | | | |
|---|---|---|---|
| 3,706,134 | 12/1974 | Sweeney | 385/134 X |
| 4,673,246 | 6/1987 | Schembri | 385/134 X |
| 4,678,264 | 7/1987 | Bowen et al. | 385/88 |
| 4,701,007 | 10/1987 | Jonca | 385/147 |
| 4,767,168 | 8/1988 | Grandy | 385/53 X |
| 4,869,566 | 9/1989 | Juso | 385/53 |
| 4,896,939 | 1/1990 | O'Brien | 385/101 |
| 4,901,004 | 2/1990 | King | 324/66 |
| 4,916,444 | 4/1990 | King | 340/825 |
| 4,968,929 | 11/1990 | Hauck | 324/66 |
| 4,991,927 | 2/1991 | Anstey | 385/101 X |
| 5,037,167 | 8/1991 | Beaty | 385/147 |
| 5,065,448 | 11/1991 | Ortiz | 385/70 X |
| 5,066,139 | 11/1991 | Soderberg | 371/20.1 |
| 5,107,532 | 4/1992 | Hansen | 379/25 |
| 5,157,750 | 10/1992 | Grace | 385/76 |
| 5,166,970 | 11/1992 | Ward | 379/21 |
| 5,204,929 | 4/1993 | Machall | 385/135 |
| 5,228,105 | 7/1993 | Glista | 385/135 X |
| 5,247,603 | 9/1993 | Vidacovich | 385/135 |
| 5,305,405 | 4/1994 | Emmons et al. | 385/73 |
| 5,325,455 | 6/1994 | Henson et al. | 385/89 |

*Primary Examiner*—Brian Healy
*Attorney, Agent, or Firm*—St. Onge, Steward, Johnston & Reens

[57] ABSTRACT

An optical patch panel system is described wherein incoming and outgoing optical fibers are connected to fixed port locations of an optical fiber patch panel. This panel has a plurality of ports formed of optical fiber and electrical couplings. A plurality of optical fiber patch cables having end connectors are provided to operatively connect with the patch panel couplings. Each patch cable includes one or more optical fibers and one or more electrical conductors. The conductors terminate at electrical connectors that mate with the electrical couplings. The optical fibers in the patch cable terminate at optical connectors that mate with the optical couplings. The optical and electrical connectors are integrally mounted with each other so that optical engagements of optical connectors and couplings are at the same time accompanied by an electrical connection between electrical connectors and couplings. A control system is described for determining monitoring and guiding the interconnections of ports at the optical patch panel.

43 Claims, 11 Drawing Sheets

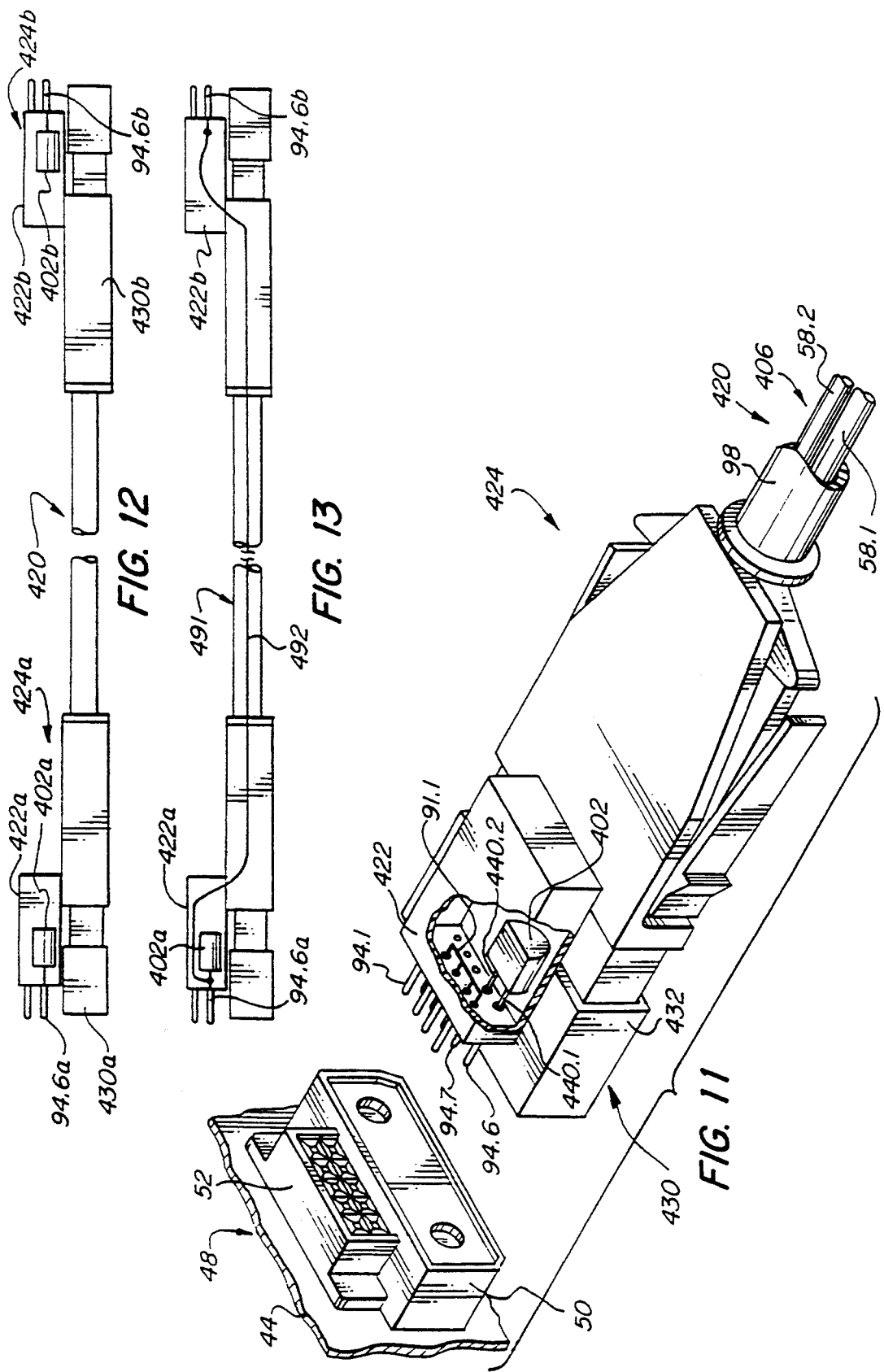

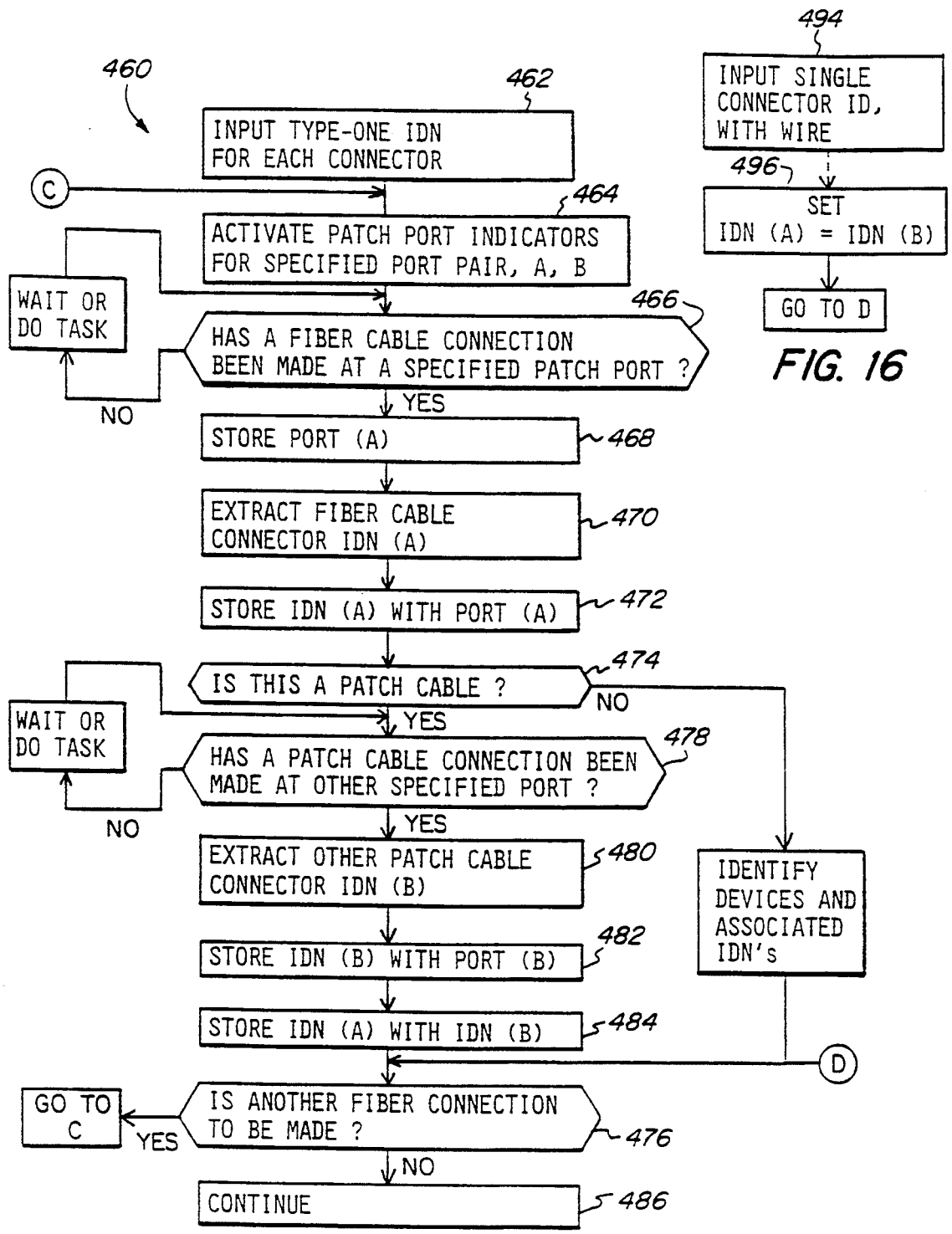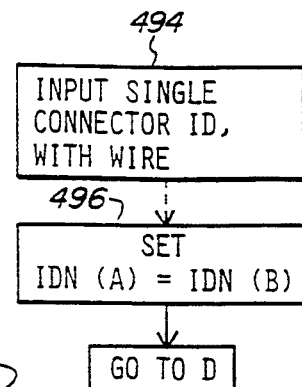
FIG. 16
FIG. 15

OPTICAL FIBER CONNECTION MONITORING APPARATUS, PATCH PANEL CONTROL SYSTEM AND METHOD OF USING SAME

Prior Applications

This application is a continuation-in-part of U.S. patent application Ser. No. 08/134,073, filed Oct. 8, 1993, now abandoned.

Field Of The Invention

This invention generally relates to an optical fiber connection monitor and an optical fiber patch panel with which fiber patch connections can be controlled and verified. More specifically, this invention relates to an optical fiber patch panel and a control system and connectors and cables therefor.

BACKGROUND OF THE INVENTION

In U.S. Pat. No. 5,107,532 to Hansen, et al., a system is described to trace conductors in a telephone wiring system for a building. The tracing of conductors is done between terminal blocks by use of trace signals placed onto conductors by a controller/supervisor system using a local area network.

U.S. Pat. No. 5,166,970 teaches a device with which two persons can communicate and establish a label designation for the ends of a circuit over which they communicate.

U.S. Pat. No. 4,968,929 to Hanck, et al., describes the use of loops to interrogate cable plug connections.

In optical fiber communication systems, it is not unusual to have a large number of external optical fibers enter a communication center. The fibers are terminated at a fixed position in a panel. An optical fiber patch panel is then used with optical fiber patch cables to couple the optical fibers to various endpoints. The optical fiber patch cables typically are provided with fiber connectors, such as of the ESCON push-on, pull-off type that mesh with optical connectors in a panel where the external fibers are terminated.

In a common application for an optical fiber patch panel, the incoming and outgoing optical fibers are terminated at fixed positions of a fiber terminal panel. Once the fibers are so terminated, no further changes in position occurs or is permitted since the fiber ends frequently are part of a very long fiber cable that may originate or terminate at a remote location that can be miles away or at some other floor, or at another portion of the same room in a building. An optical fiber patch panel is then relied upon to accommodate the physical connection of incoming and outgoing optical fibers to various equipments. A change in the equipment to which an optical fiber must be connected or a reconfiguration of the communication system of which the optical fibers are a part can then be accommodated with appropriate changes at the optical patch panel.

The management of an optical fiber patch system requires maintenance of a record of connections and disconnections. The record can be kept on a computer, a log, or status board. If an event occurs and patch connections are altered, it frequently happens that the changes are not recorded or some are incorrectly recorded. As a result, the connection status map becomes inaccurate, and the manager of the communication center loses confidence in the status map.

Another problem arises because of the lack of security for the optical fiber patch system. If any unauthorized modification to the patch configuration is made, it will not be recognized or recorded. It will then not be noticed until a physical inventory is made.

Human errors frequently arise in making optical fiber patch connections. A vital link can be mistakenly disconnected or a wrong connection made, resulting in extensive and often expensive communication problems.

Another problem arises when optical fiber connections are broken. The connector with the active optical fiber then may emit an optical beam that can be particularly potentially harmful when a high power optical laser beam is being passed through. Inadvertent motions of the active connector may result in an injury. An optical fiber connection is needed with which such injury can be avoided.

SUMMARY OF THE INVENTION

With an optical fiber patch panel in accordance with the invention, these problems associated with prior art optical fiber patch systems are eliminated. This is achieved by providing one optical patch panel in accordance with the invention with a plurality of fixed optical fiber ports. Each fiber port has an optical fiber coupling and an associated electrical port coupling. A plurality of optical fiber patch cables are provided with electrical conductors terminating at electrical cable coupling that plug into the port electrical couplings associated with the fiber ports. The connection of an optical fiber patch cable to a pair of ports results in the completion of a control signal loop through which a connection map can be derived by a control system.

The control system has electrical access to the fiber port electrical couplings. Since the system "knows", by way of database compilation, where each port's electrical coupling is located, the system can guide and continuously monitor the fiber optic connections and disconnections at a patch panel. Hence, the control system can provide the manager with an up-to-date reliable and accurate status map of the optical fiber connections made at the optical fiber patch panel.

The term coupling as used herein means the same as connector and is used to clarify the description.

As described herein for one optical fiber patch panel system in accordance with the invention, an optical patch panel is provided on which each optical fiber port is formed of an optical fiber port connector formed by one or several standard optical fiber connectors located at the ends of incoming and outgoing optical fibers and an associated electrical port coupling which is closely mounted to the fiber port coupling. Fiber patch cables are provided which terminate with optical fiber cable connectors and electrical cable connectors that operatively engage the port couplings. The optical patch panel is further provided with indicators, such as LED's, adjacent the ports. A control system is connected as well as to the indicators to direct attention to and guide an installer as to where a fiber patch cable should be connected or disconnected.

Continuous electrical circuit loops are formed by connected optical fiber cables whereby respective intercoupled ports can be identified and fiber connections verified in a repetitive manner.

The electrical connectors are preferably so mounted with respect to the optical fiber connectors at the ports and on the cables so as to assure an electrical connection when fiber connectors are engaged. The fiber patch cable electrical connectors are in the preferred embodiment an integral part of the fiber connector so that seating of the latter at a port also automatically engages electrical connectors. The invention, however, also contemplates the use of associated but physically separated electrical connectors.

In still another form of an optical fiber patch panel system in accordance with the invention, control connectors at ends of the optical fiber cables are provided with circuit elements connected to terminals in the control connectors. The circuit elements are selected to respond to polling signals from the control system with unique identification signals with which the control system can determine which ports are connected together or which device is connected to a port.

For example, during installation of optical fiber cables and the patch panels of one system in accordance with the invention the control system undertakes a compilation of a data base with which the various connections made by the installer are recorded or stored in memory. The identification information related to panel ports that are interconnected are stored together with the identification signals from the circuit elements in the optical cable control connectors as well as characteristics or identifications of devices that are connected by optical fiber cables to ports of a panel.

By placing such circuit element at each end of an optical fiber cable the electrical wires between cable ends are not needed because during installation the control system learns to identify the ends of each optical fiber cable. Hence, by polling the circuit elements connected to a port the control system can derive signals representative of interconnected ports.

A similar result can be achieved with a single circuit element located in one control connector at one end of an optical fiber cable. The circuit element is connected by a polling wire, embedded with the optical fibers in the cable, to a terminal of the control connector at the other end of the cable. In this manner the circuit element can be polled from either end of the connected optical fiber cable to derive port connectivity signals.

With an optical patch panel system in accordance with the invention, a real time snapshot of the status of the optical fiber patch map can be obtained by strobing or polling terminals, or pins in port electrical connectors and monitoring receiving terminals or pins to derive a connection map of interconnected optical fibers. This map can be updated in a quick repetitive manner. The updated fiber connection map may be compared with previous maps to detect changes and an alarm can be indicated when an unauthorized change has been detected.

Another feature of the invention is its ability to provide an appropriate monitor for an optical fiber connection between an optical fiber connector and coupling. This involves providing an optical fiber with an end-located control connector that has a built-in control signal loop. When the fiber connection is made, a control signal can be sent through the loop to monitor the fiber connection.

In the event a fiber disconnection occurs. A disconnect signal indicative of the event is generated and can be used to disengage or reduce the intensity of the optical beam passing through the fiber connection. In this manner, the active side of the fiber connection can be rendered safe to handle.

It is, therefore, an object of the invention to provide an optical patch panel system with which an optical fiber connection map can be quickly obtained, updated, and unauthorized changes promptly detected and fiber connections and disconnections can be reliably made. It is a further object of the invention to provide an optical patch panel and fiber patch cables and connectors with which connections and disconnections of optical fibers can be accurately monitored and maintained. It is still further an object of the invention to provide a technique and apparatus for monitoring optical fiber interconnections. It is still further an object of the invention to provide a technique and apparatus for rendering a disconnected optical fiber connection harmless, It is still further an object of the invention to provide a panel with which connections and disconnections of optical fibers can be monitored and maintained in a convenient rapid manner.

These and other objects and advantages of the invention can be understood from the following detailed description of several embodiments in accordance with the invention as shown in and described with reference to the drawings,

BRIEF DESCRIPTION OF THE DRAWINGS

FIG. 6 is a table of control signals and a schematic representation of connections made inside a fiber patch cable connector;

FIG. 11 is a perspective partially broken away view of another optical fiber patch cable control connector in accordance with the invention;

FIG. 12 is a side, broken away, schematic view of another optical fiber cable in accordance with the invention;

FIG. 13 is a side, broken away, schematic view of still another optical fiber cable in accordance with the invention;

FIG. 15 is a flow chart for part of the operation of a control system and the monitoring of the patch panel using the optical fiber cables as shown in FIGS. 11, 12 and 14; and FIG. 16 is a flow chart for illustrating use of the optical fiber patch cable shown in FIG. 13.

DETAILED DESCRIPTION OF THE DRAWINGS

Figure 1:
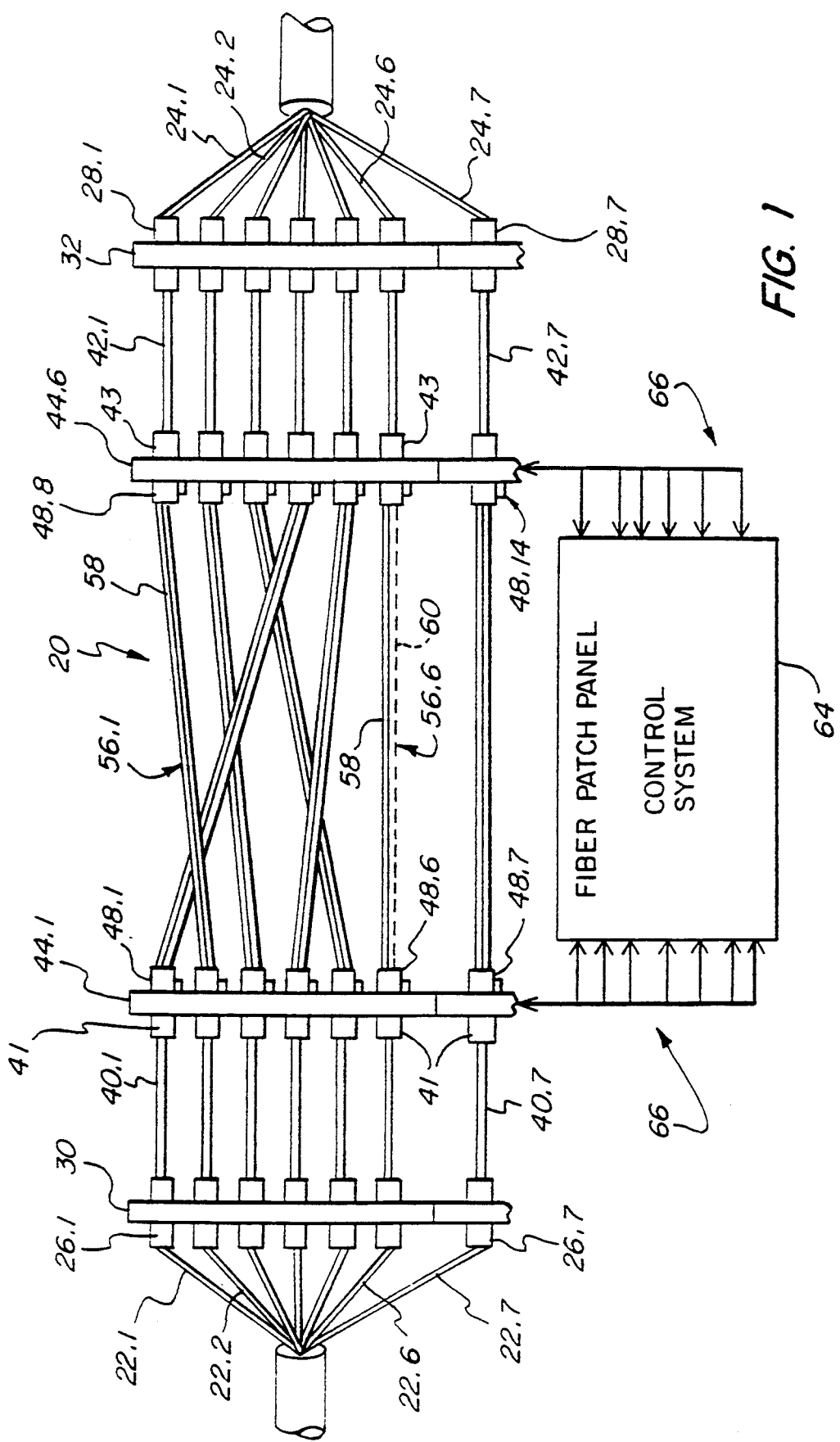
FIG. 1 is a schematic block diagram of an optical fiber patch panel system in accordance with the invention.

With reference to FIG. 1, an optical fiber patch panel system 20 in accordance with the invention is shown. A plurality of optical fibers 22.1–22.7 enter a communication center and need to be optically coupled to a plurality of optical fibers 24.1–24.7. The optical fibers 22 and 24 may be the terminal ends of very long fibers or lead to equipment within the same room where the system 20 is located.

In either case there is a need to be able to couple the optical signals on any one fiber to any other fiber and to rearrange the coupling as may appear appropriate to the manager of the communication system.

The use herein of numbers after the decimal point or the use of letters after a numeral signifies specific items while without a decimal point or letters, the numerals designate one or more of the items in a general way.

Particularly when the optical fibers 22 or 24 are very long is it desirable and practiced in the art to initially connect the optical fibers to fixed connectors 26 and 28 respectively in panels 30, 32 known as Demark panels. In a typical situation the fiber ends have extra lengths, not shown for clarity, before their end connectors 26, 28. These Demark panels are not always needed and are shown here for illustrative purposes. The optical fibers are shown as single though the fibers can be grouped in pairs for duplex communication. The connectors 26, 28 can be for single or duplex fibers with both types well known in the art.

Figure 3:
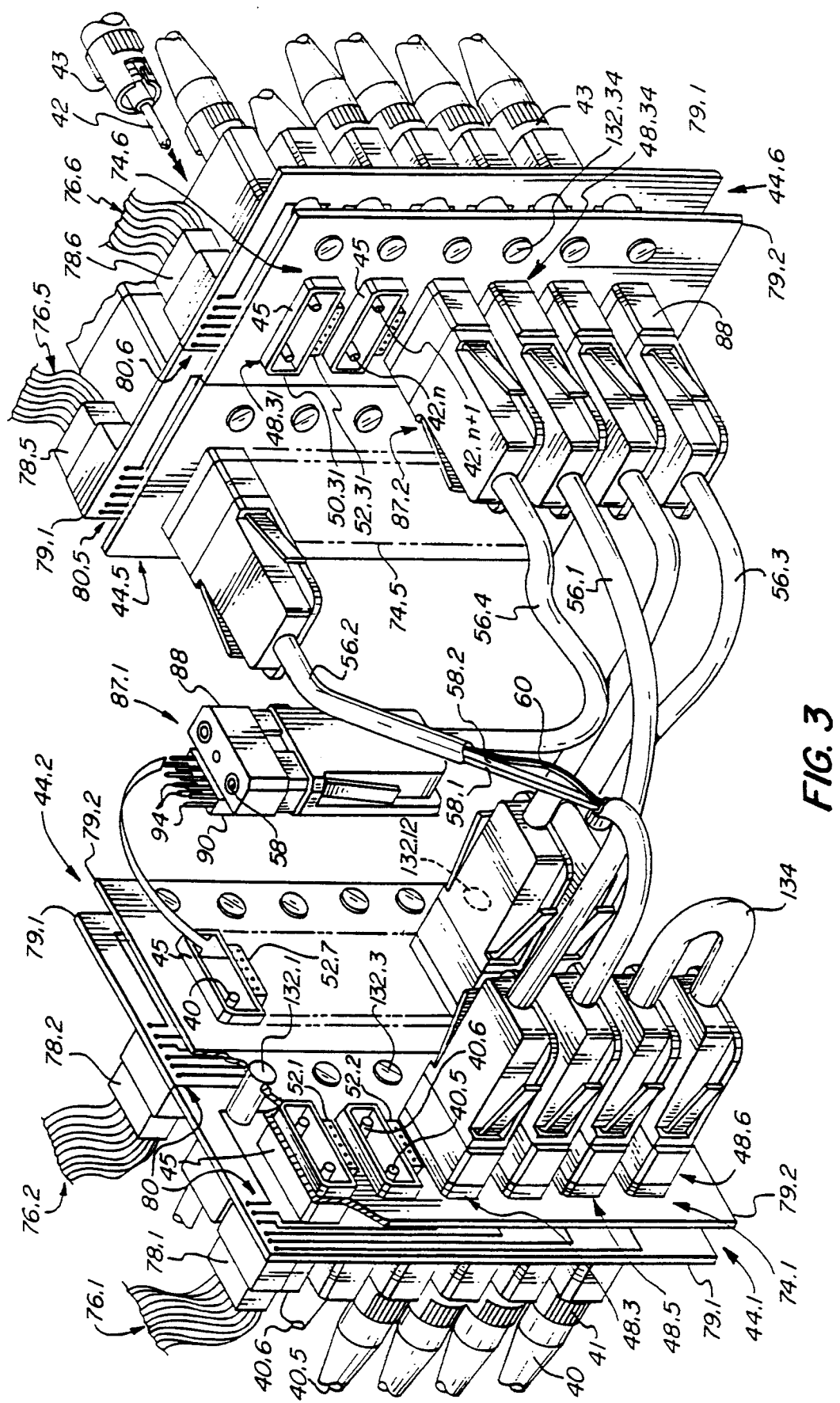
FIG. 3 is a perspective folded view of an optical fiber patch panel in accordance with the invention.

Optical fiber cables 40 and 42 are then used to couple the optical fibers 22 and 24 respectively to fixed, known positions at 41, 43 of an optical patch panel 44 shown for clarity as two separate subpanels 44.1 and 44.6. The optical patch panel 44 has a plurality of ports 48 each formed, as shown in FIG. 3, of both an optical coupling or connector 50 and an associated electrical coupling or connector 52. In a typical case, the optical coupling 50 is formed of a pair of standard optical fiber connectors, such as known as ESCON connectors 43, placed at the ends of optical fibers 40 or 42 and mounted in sleeves 45.

Optical fiber patch cables 56 are used to interconnect the ports 48 in such manner as the manager of the system 20 deems necessary. Each optical patch cable 56 includes one or more optical fibers 58 and an electrical cable 60. The electrical cables 60 interconnect through ports 48 to provide a path by which a control system 64 can determine the ports 48 to which an optical patch cable 56 is connected and thus also which optical fibers 22 and 24 are coupled to each other. Control system 64 is, therefore, coupled to panels 44.1 and 44.6 through appropriate circuitry and via lines 66 to strobe signals through the ports 48 and electrical cables 60 to determine the connections made by the optical fiber patch cables 56.

Figure 2:
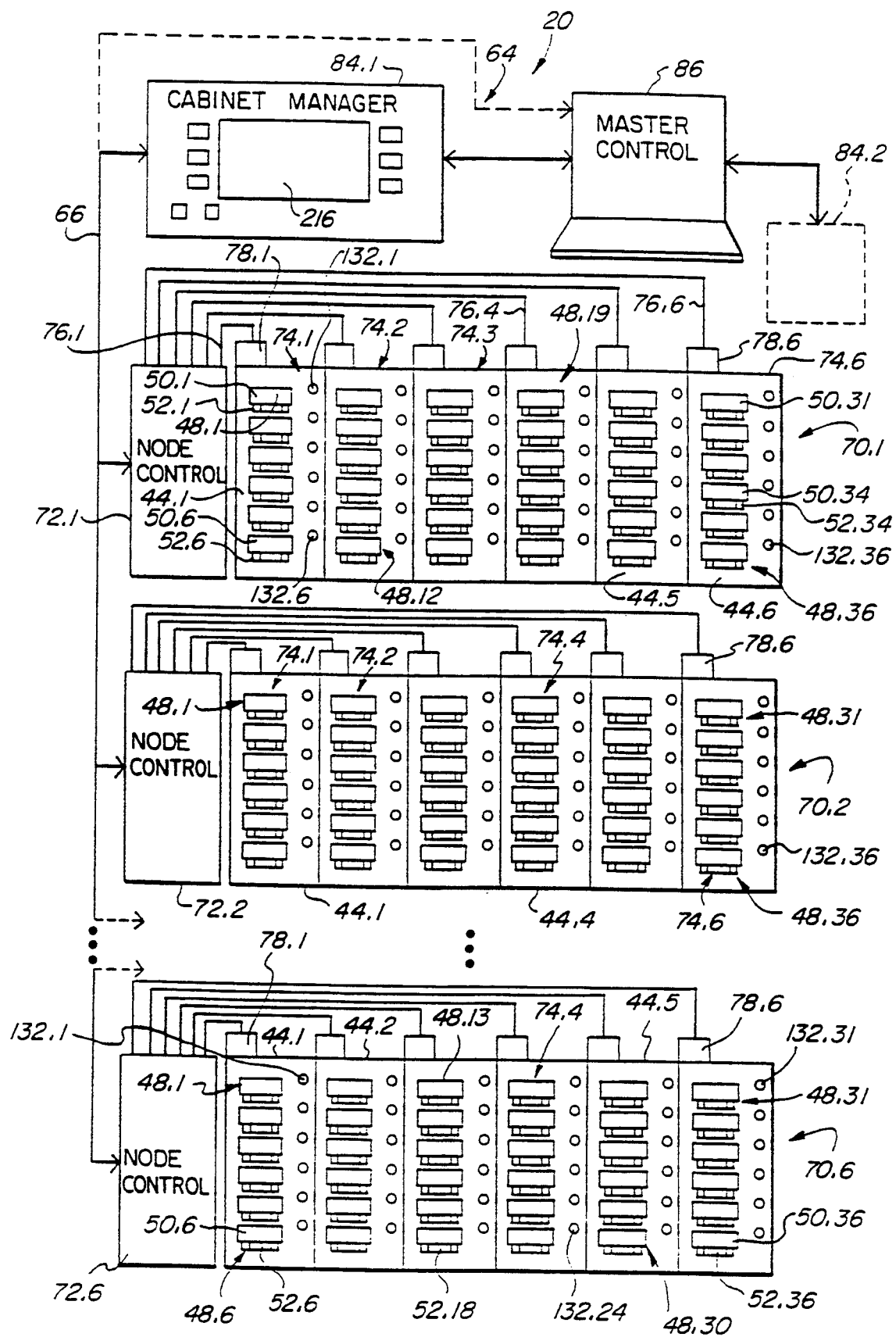
FIG. 2 is a more detailed schematic block diagram view of an optical fiber patch panel in accordance with the invention.

With reference to FIGS. 2 and 3, part of optical fiber patch system 20 is illustrated in further detail. A plurality of arrays 70.1, 70.2, 70.6 of optical patch panels 44.1, 44.2, through 44.6 are shown. Each array 70 is controlled by a node controller 72 and has six optical fiber port groups 74.1–74.6. Each port group 74 has six ports 48 mounted on a common patch panel 44. Each port 48 is formed of an optical fiber coupling or connector 50 and an associated electrical coupling or connector 52. The optical fiber coupling 50 in practice is formed by the projection of optical fibers such as 40 or 42 from standard connectors 43 into mounting sleeves 45 to which connectors 43 are mounted in pairs for a duplex connection. However, simplex or a single fiber connection can be used. The number of ports 48 in a group 72 can vary, with the illustrated embodiment being selected in conformance with currently commonly available optical fiber panels.

The patch panels 44 are formed of spaced-apart boards 79.1 and 79.2 (see FIG. 3) of which board 79.1 bears a printed circuit 80 which interconnects a group connector 78 to electrical couplings 52 in the various ports 48 on the patch panel 44. The sleeves 45 are mounted to boards 79.2 and extend through boards 79.1. Each node controller 72 is connected by an electrical conductor cable 76 to couplings 52 via connectors 78 mounted on printed circuit board 79.1 and associated with a port group 74.

The node controllers 72 are coupled to a local managing processor 84 which in the particular embodiment is located with the node controllers 72 and optical patch panels 44 in a common cabinet, not shown. A master control 86 is used to provide a higher level and remote control over various cabinet managers 84 as may be used at a facility. The intermediate managing processor 84 is not always needed.

Optical fiber coupling between the ports 48 is done with fiber patch cables 56 whose ends 87 are each terminated with an optical fiber connector 88 and an associated electrical cable control connector 90. The cable fiber connector 88 is generally of a standard type to couple to and mount to a port fiber coupling 50.

Figure 4:
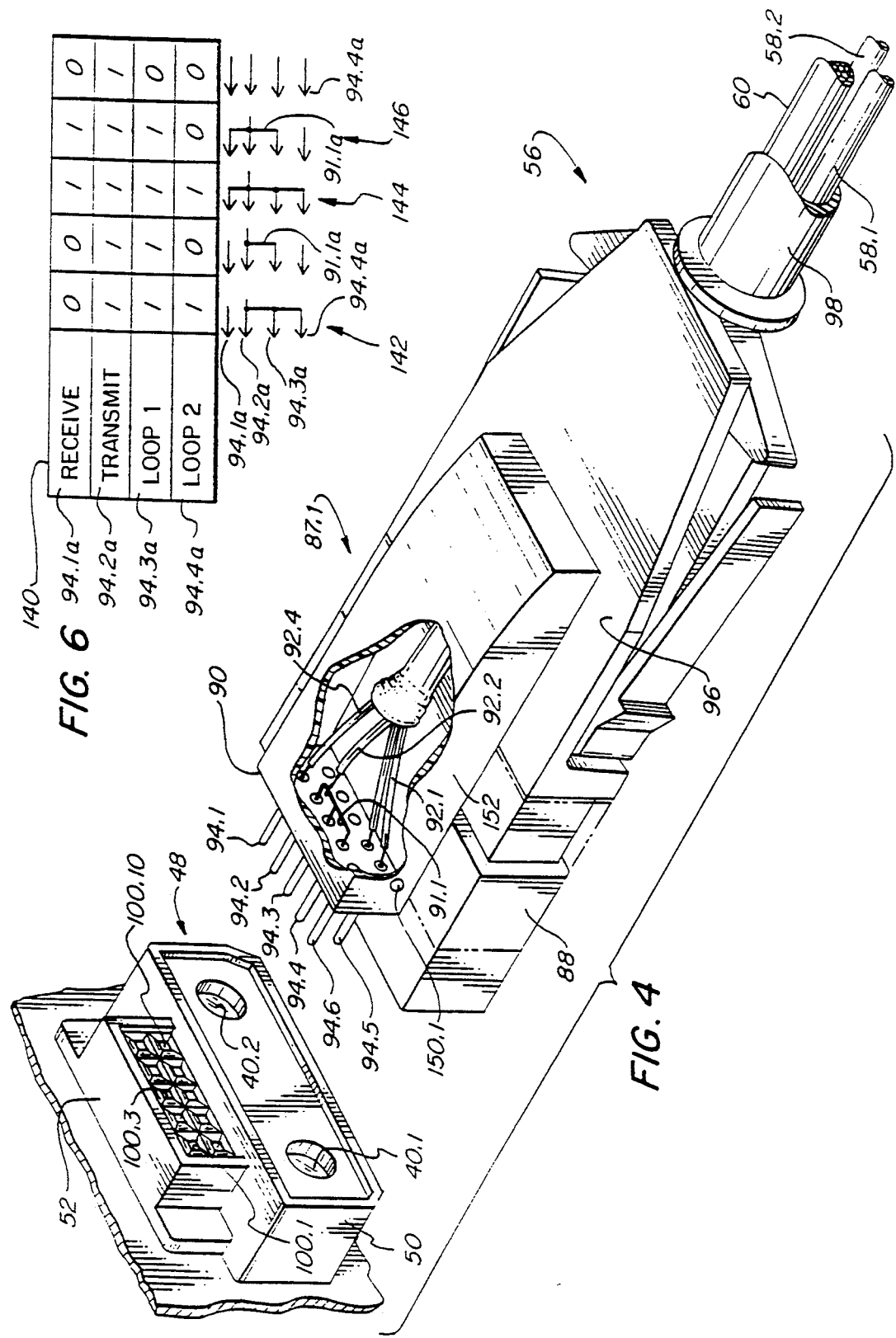
FIG. 4 is an enlarged partial broken away perspective view of a port connection and an optical fiber patch cable in accordance with the invention.

As illustrated in FIGS. 3 and 4, the cable ends 87 are formed by making the electrical connectors 90 an integral part with the optical fiber connectors 88. The electrical conductors such as 92.1–92.4 which terminate at appropriate pins 94, feed as shown in FIG. 4 through an aperture, not shown, into the housing 96 for coupling 50. In this manner, the optical fiber cables 58 and electrical conductors 92 are passed through a common sheath 98 to the other end 87.2, see FIG. 3, of fiber patch cable 56.1.

With the integral mounting of electrical connectors 90 and optical fiber connectors 88, an essentially simultaneous coupling by optical fibers 58 and electrical conductors 92 at a port 48 is obtained. This enables an immediate confirmation of the optical fiber connections at the patch panel by the control system 64.

Figure 5:
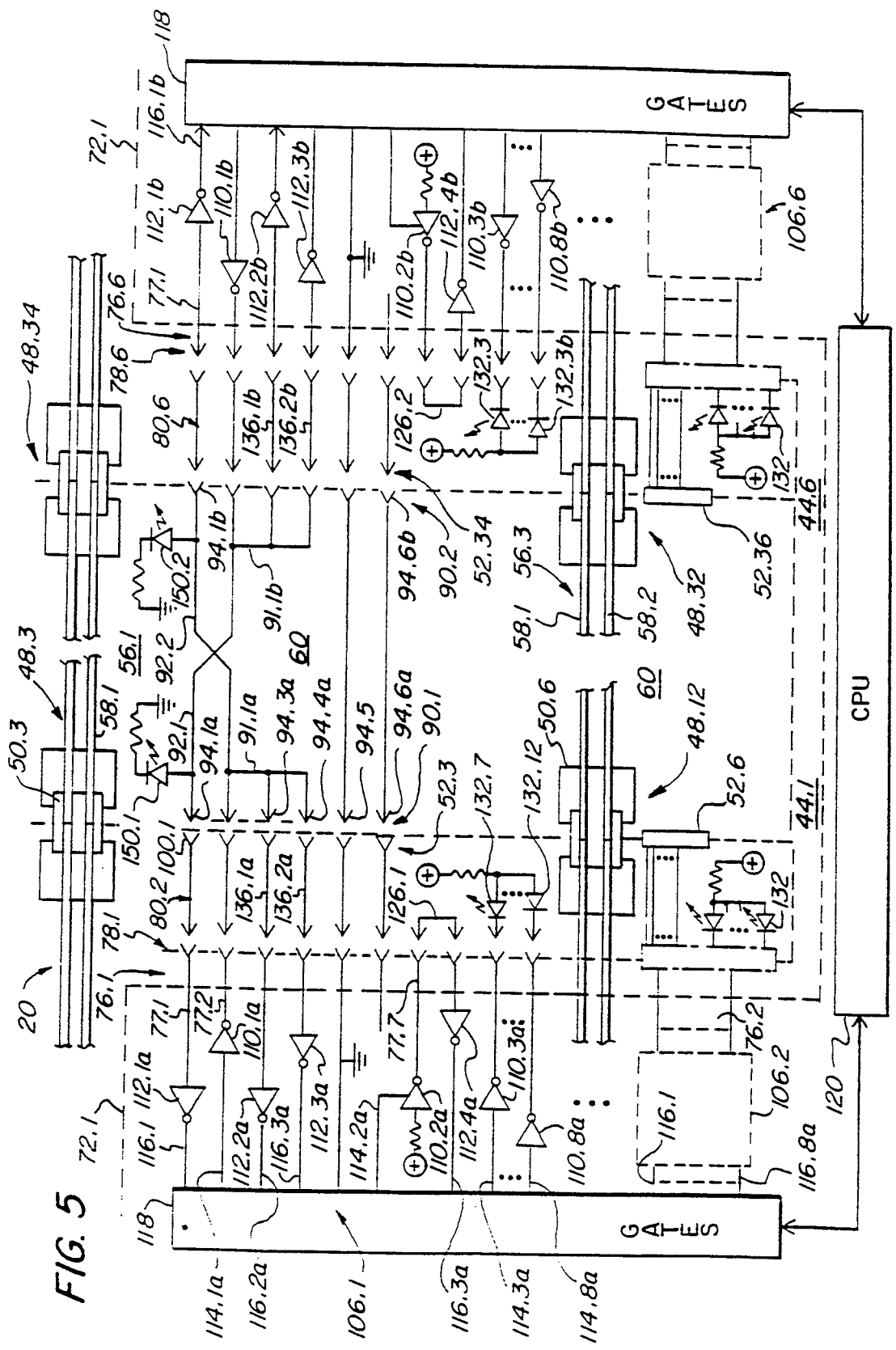
FIG. 5 is a further detailed schematic block diagram view of the control system for the optical fiber patch panel system in accordance with the invention.

FIG. 5 illustrates a portion of control system 64 used to establish and verify connections at an optical patch panel in accordance with the invention. The patch panel is shown in two parts 44.1 and 44.6 respectively corresponding for example to port groups 74.1 and 74.6, see also FIG. 3. Of these latter port groups, only ports 48.3 and 48.34 are shown in some detail since the other ports 48 in the panels 44 are substantially the same in layout except that some may have a fiber coupling 50 for a single fiber 58.1 and others may be for a duplex fiber coupling 50. Since similar circuits are used in the ports, items associated with port 48.3 or a panel are distinguished from those in port 48.34 and its panel by respective designations "a" and "b".

Access to conductors 92 in optical patch cables 56 by node controller 72.1 is obtained through cables 76.1 and 76.6 (see FIG. 3) and their respective group connectors cables 78.1 and 78.6. The pc boards 79 to which the latter connectors are connected have printed circuits 80.1 and 80.6 that enable the conductors 77 in cables 76 to connect through group connectors 78 to terminals 100 in electrical port control connectors 52 as well as to other circuits used in the control of the optical fiber patch system 20.

The cables 76.1 and 76.6 connect to the node controller 72.1, shown in FIG. 2, and which, as shown in FIG. 5, has appropriate networks 106 formed of drivers 110 and receivers 112 for the various operations of the optical patch system 20. A driver 110.1a is used to deliver a test signal on line 77.2 from gate network 118 controlled by node controller 72.1 and is coupled through connector 78.1, printed circuit 80.1, control connectors 52.3 and 90.1 onto conductor 92.2 in optical patch cable 56.1. The test signal passes through control connectors at the other end of cable 56.1 and a group connector 78.6 and cable 76.6 for a pc board 79 to a receiver 112.1b within node controller 72.1.

The output on line 116.1b from receiver 112.1b is passed into a CPU 120 in node controller 72.1, by gate network 118. If the presence of the test signal is recognized, the ports of insertion and reception of the test signal are noted and stored.

This process is repeated for selected drivers 110 and receivers 112 in the patch panel under control by CPU 120. Each port group 76.1 is sequentially addressed and tested by CPU 120 by activating first a driver output 114 and then sequentially monitoring the appropriate receiver input lines 116 at other ports 48 in the same panel group 70, see FIG. 2, as well as other panel groups 70.

Another examination by a node controller 72 is to determine how many and which port groups 74 are in the optical patch panel system 20. Hence, return loops 126 are provided on printed circuits 80 whereby a test signal from driver 110.2a is fed directly back through group connector 78.1 and receiver 112.4a to gate network 118. Since there are known to be six ports 48 in each group 74, the detection of a receiver signal at an input line 116.3a identifies to the CPU 120 that this associated port group 74.1 is an active part of the optical patch panel system 20.

Concomitantly, this requires a disconnection of group connector 78.1 to remove an associated optical patch port group from the interconnection map inside the node controller 72.1, cabinet manager 84.1 and master control 86.

Another feature provided by the optical patch panel system 20 is an appropriate guide for the installer of the optical patch cables 56. This involves, for example, an appropriate display at a display 130 in the cabinet manager 84, see FIG. 2, with the instruction to connect an optical patch cable 56 between one particular port 48 and another port 48. The ports 48 can be in the same patch panel group 70 or in a different group.

Specific displayed instructions are accompanied by indicators 132 adjacent each port 48. Such indicators can be LED's activated by grounding their cathodes through drivers such as 110.2a and 110.2b. Other types of indicators can be used. As shown in FIG. 5, activation of an LED such as 132.1 through drivers such as 110.2a and 110.2b is done with a CPU 120 generated signal applied through gate network 118 to a driver 110.3a. The latter's output is coupled through connector 78.1 to the cathode of LED 132.1 associated with port 48.1 while the anodes are connected to a voltage source available on the printed circuit board 79 to which the LED's in the group 74.1 are mounted.

Hence, by activating the appropriate LED's 132 next to a port 48, the installer can be provided with a specific light indication next to the ports to which an optical patch cable 56 is to be connected. The activation of an LED 132 can be by way of a steady or blinking light or of a particular color. For example, several LED's can be used at each port 48, but of different colors, one color for designating a connection to be made and another color for breaking a fiber connection.

An optical fiber patch cable 56 may have different characteristics, such as simplex (a single fiber), or duplex (one for transmission and the other for receiving). Another cable configuration may involve as shown in FIG. 3 a U-shaped jumper 134 of rigid construction and sized to plug into adjacent ports such as 48.5 and 48.6. The U-shaped cable handle may be for a simplex optical fiber or duplex fibers. It is desired that the control system 64 be capable of detecting these different configurations as well detect the absence of an optical patch cable connection at any port.

The control system, therefore, is provided at each port 48 with several control loops 136.1a and 136.2a to enable the software in the control system to determine the nature of the connections made at an optical patch panel. The control loops commence at the optical patch cable electrical connector 90 where the outgoing signal conductor, such as 92.2 at connector 90.1, is selectively connected back with a conductor 91.1 to one or more or none of two other terminals 94.3 and 94.4. These connections return a test signal through connector 52, the group coupling 78.1 receivers 112.2a and/or 112.3a and the gate network 118 to the CPU 120. The absence of a return test signal from these loops 136 is recognized by the CPU as the lack of a connection at the port 48.

FIG. 6 illustrates the different return connections which the software in the CPU can interpret to determine whether either a simplex or duplex optical patch cable 56 or a U-shaped jumper is being used. A chart 140 displays the signals states at terminals 94.1a–94.4a and thus, also at the gate network 118 and CPU 120 of FIG. 5. These states arise as a result of the connection of the interconnecting conductor 91.1a or use of a U-shaped jumper as shown in FIG. 6. Below the chart 140 is a schematic representation of the interconnection of terminals 94.1a–94.4a by jumper conductor 91.1a to produce the signals states shown in chart 140. Note that the conductors 92.1 and 92.2 are disconnected in the case of a port-to-port U-shaped jumper so that the terminals 94 associated with these conductors can be used to derive a determination of what type connection is made at a port. This imposes a predetermined convention for such U-shaped jumpers to enable a node controller to determine the ports to which a jumper is connected.

If, for example, the connection inside a connector 90 is as illustrated at 142, which is the same as shown in FIGS. 4 and 5, then the code returned to the CPU in response to a test signal on line 114.1a (see FIG. 5) is 0111. This indicates the presence of a connected optical fiber patch connector at port 48.3.

If the connection inside a patch connector 90 is as illustrated at 144, then the code returned to the CPU is 1111. This identifies to the CPU that a U-shaped optical patch jumper 134 is employed and that by predetermined convention, the other end of the jumper is connected for example to the next lowest port 48. Different conventions can be employed such as from side to side into adjacent ports, for example, port 48.3 to port 48.9, to which a rigid optical fiber patch jumper is capable of connecting into.

Alternatively, one or more additional loops 136 could be used to provide additional variables for the identification of different patch connectors 90. In such case, there would be a need for one or more additional receivers 112 at each port 48. This has the advantage that the use of a predetermined port connection convention can be dispensed with and the node controller's ability to directly examine with the test signals all of the port connections is preserved.

Another feature of the invention resides in its ability to identify each of the many optical fiber patch cables used in a patch panel. This involves the use of an indictor such as 150 at the ends 87 of each cable 56, see FIGS. 4 and 5. The indicators 150 can be LED's which may provide a steady or blinking light after one cable end 87 is connected to a port 48. The current for the indicators 150 is drawn from either conductors 92.1 or 92.2. The location of the indicators 150 can be either at the side face 152 of electrical optical patch connector 90 or at another suitable location.

Figure 7:
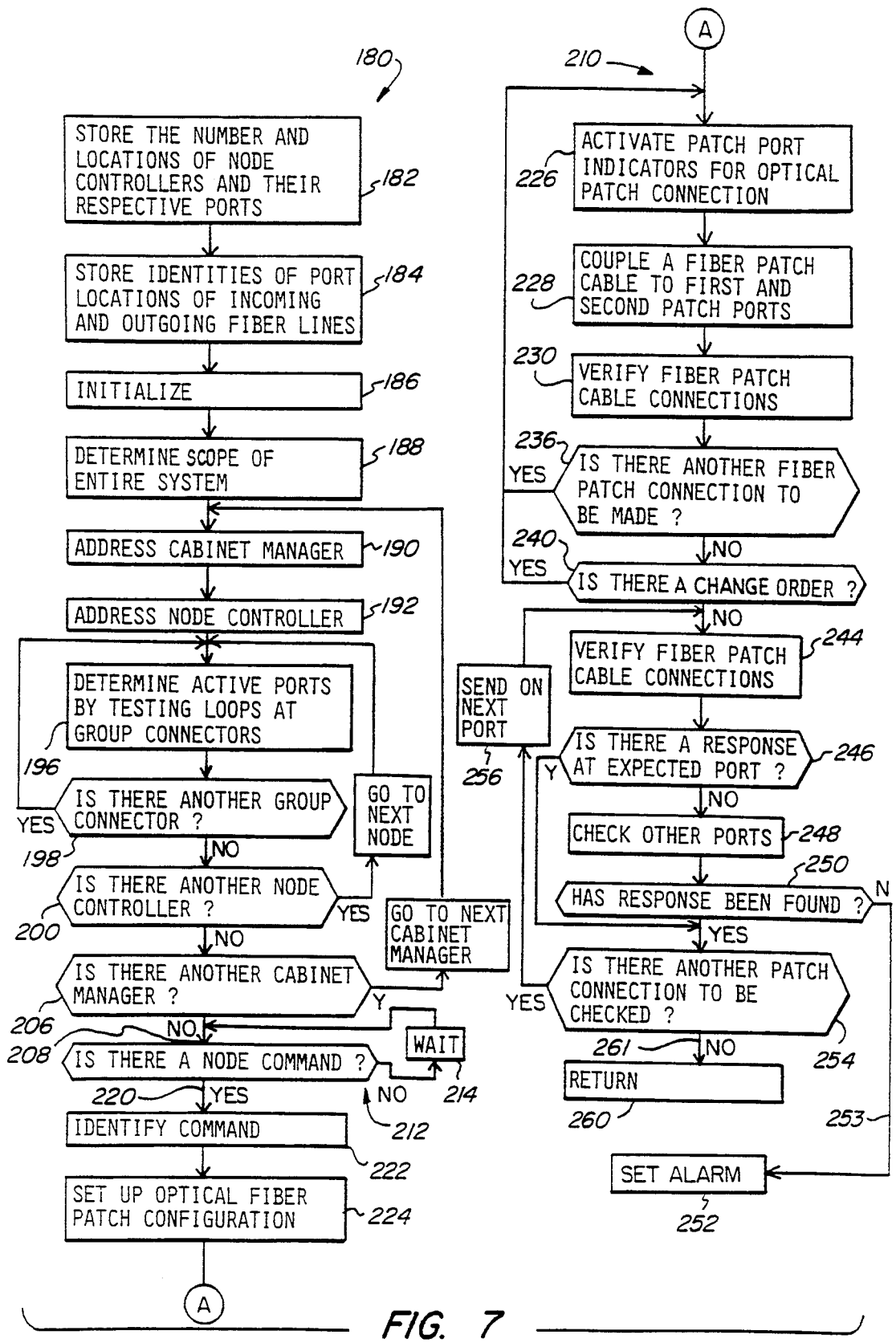
FIG. 7 is a flow chart for the control system used in the optical fiber patch panel system in accordance with the invention.

Operation of the optical fiber patch panel system is illustrated in FIG. 7 at 180 with various steps performed by microprocessors employed at the node controller level as well as at the cabinet manager and master control levels.

Commencing at 182, the number and port locations of node controllers 72 are stored. This involves, for example, assigning particular addresses for each of the ports 48 coupled to a node controller, the groups 74 to which a port 48 belongs, and the addresses for cabinet managers 84 as may be employed. Upon completion of this step, system 120 has or can generate a map of all ports 48 in the system and how to address each one as well as specific terminals 100 of electrical control couplings 52 through a group cable 76 and connector 78.

At 184, the identities of fixed optical fiber connections and their locations is entered. This links the incoming and outgoing optical fibers 22 and 24 to particular connectors 41 and thus ports 48 at the optical patch panels 44. Upon completion of this step, system 20 can identify and associate the optical fibers entering the optical patch panels 44 and where the fibers lead to. It is normally expected that incoming an outgoing fibers 40, 42 remain connected to the same port 48.

At 186 various initializing steps are undertaken at the various controller levels as appears appropriate. A technique is then entered at 188 to determine the scope of the optical patch system 20 that is actively connected. The master control 86 commences this at 190 by addressing the various cabinet managers which in turn at 192 address the node controllers under their control in sequence.

At 196 a first node controller 72 sends in sequence a test or polling signal or strobe to each loop 126 by applying a pulse on an output line 114.2a (see FIG. 5) and detects a response on a receiving line 116.3a. If no response is detected, the node controller 72.1 assumes that the associated group 74.1 of ports 48.1–48.6 is not to be used and considered. However, if a response is detected, the node controller adds ports 48.1–48.6 as part of the active optical panel system. This step is repeated for each port group connector 78 under control of the node controller 72.1 until the test at 198 comes up negative.

At 200 a test is made whether there is another node controller 72 under control of the cabinet manager 84. If so, the tests at 196 are repeated for the next node controller 72.2 (see FIG. 2) until all node controllers 72 have polled all group connectors 78 under their control.

The process is repeated for all other cabinet managers 84 after determining at 206 if there are other cabinet managers 84 in the system.

Upon completion of the polling of all group connectors 78, at 208 at the end of step 206, each node controller 72 has a map (meaning address) of all active optical ports 48 in the optical patch panel, each cabinet manager 84 has a map of all active ports 48 under control by its node controller 72 and the master control 86 has a map of all active ports 48 in system 20.

An optical patch panel interconnection grid to achieve a particular connection map is then implemented at 210 using optical fiber patch cables 56 in accordance with the invention. The underlying basis for desired connections typically may involve one or more cpu channels to be connected to various peripheral devices in a data center.

The interconnection map can be implemented for example, as illustrated at 212 by awaiting at 214, at the node controller level for a request by a cabinet manager 84 to interconnect a pair of ports 48. The interconnection can be between ports 48 controlled by different cabinet managers 84 or by different node controllers 72 under the same cabinet manager or by the same node controller 72.

In either case, the desired interconnection is preferably, though not necessarily, first displayed on a display 216 (see FIG. 2 on the cabinet manager 84 located in the same cabinet where the ports 48 to be interconnected are located.

Once an interconnection request is received at 220, for example affecting ports 48.3 an 48.34, the command is analyzed at 222 and the optical fiber patch configuration is set up at 224 by the applicable node controller 72. At 226 the appropriate port indicators 132.3 and 132.34 (see FIG. 5) are lit by a blinking or steady light or with a particular color. An appropriate optical fiber patch cable 56, as identified in the display 216 shown in FIG. 2, is connected to the ports 48.3 and 48.34 at 228 (FIG. 7). After the fiber patch cable 56.1 (see FIG. 3) is connected, the node controller 72.1 verifies at 320 the connection by polling the appropriate pins of electrical control coupling 52.3 and 52.34.

Verification involves sending a strobe signal on line 14.1a (FIG. 5) and detecting its reception on line 116.1b. The sending of the strobe signal is done under control by the CPU 120 which activates the appropriate gate inside gate network 118 and enables the appropriate gate to detect the strobe on line 116.1b.

At step 236 in FIG. 7, a test is made whether another optical fiber patch connection is to be made. If so, then steps 226–230 are repeated. When all initial fiber connections have been installed, a test is made at 240 whether there exists a request for a change in the fiber patch configuration. If so, a return is made to step 226 to implement the change order.

A key aspect of the optical fiber patch panel system of this invention involves a fiber connection verification capability that can be continually implemented. When system 20 is in normal operation, routine 180 enables each node controller 72 to sequentially activate each send line 114.1a (see FIG. 5) at 244 and monitoring a response at 246 on the expected receiver line 116.1b at another port. If no response is detected, all other receiver lines 116.1 at other ports 48 are monitored at 248. If necessary, other strobe signals are sent out on line 114.1a until all other receiver lines 116.1 have been monitored.

If no response is found at 250 after checking all of the other ports, an alarm is set at 252. If a response is detected, then the port 48 that yielded the response is noted and the information is used to update the status map or note an unauthorized change or perform such other management function as may be required.

At 254 a test is made if another patch connection is to be checked. If so, a strobe signal is sent out at 256 on the next send line, for example, 114.2, and steps 244–254 repeated. If no other optical patch connection is to be made, the program can return at 260 to repeat the port monitoring process.

With reference to FIG. 5, port send lines 114.1 are strobed with pulses or continuous signals, the return loops 136 are monitored by CPU 120 via gates 118 and receivers 112.2 and 112.3. Hence, an identification and confirmation of the type of optical fiber patch cable connected to the port can be simultaneously done.

A particularly advantageous feature of the invention involves the monitoring of optical fiber interconnections, whether these are a part of a patch panel or not. This involves the use of a control signal loop such as 126 formed inside an optical fiber connector. The loop can be formed as illustrated in FIG. 5 by interconnecting a pair of electrical terminals associated with the optical fiber connector, either as a separate electrical connector or as part of the fiber connector.

When an optical fiber connection is monitored, a disconnect signal can be generated when a connection is opened to alert an operator of a loose active fiber and, if desired, cause an automatic reduction of the intensity of a laser beam emanating from the active side of a loose optical fiber connection.

Figure 8:
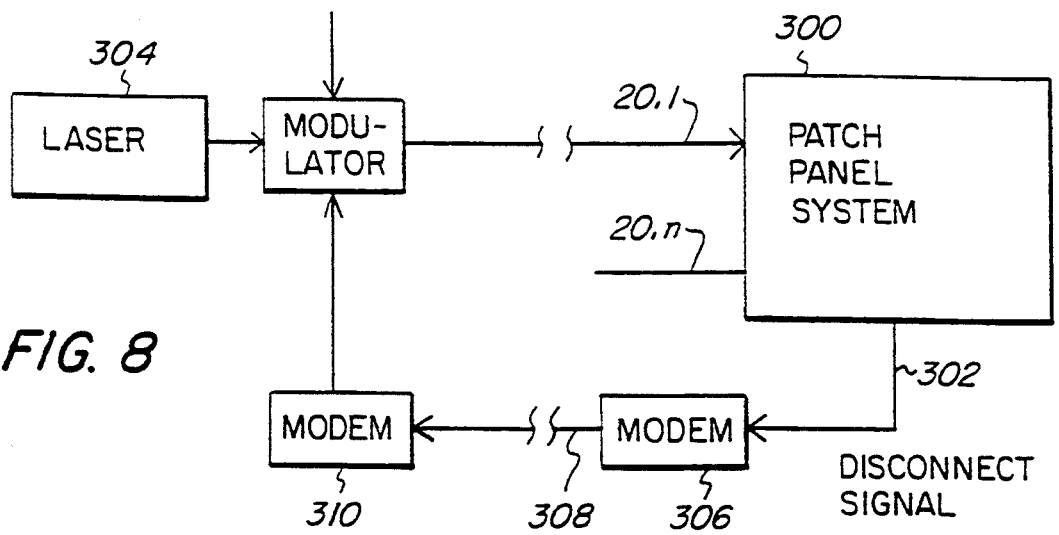
FIG. 8 is a block diagram view of an illustrative system for rendering an active, opened fiber connection harmless.
Figure 9:
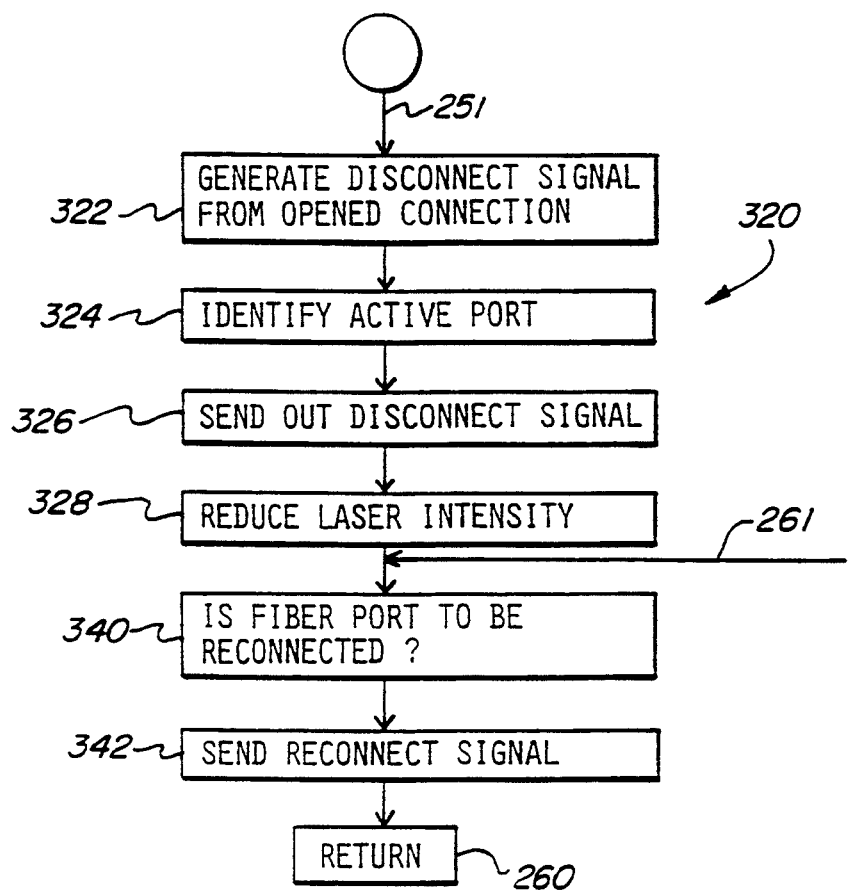
FIG. 9 is a flow chart of an illustrative technique for monitoring optical fiber connections and rendering an active fiber harmless in case that fiber connection is opened.

FIGS. 8 and 9 are illustrative of a fiber connection monitor and its ability to alert and avoid a hazardous loose fiber connection from which a relatively high power optical beam could cause injury.

At 300 is a patch panel system as heretofore described and from which a disconnect signal can be generated on line 302 indicative of a loosened or opened fiber connection at a port 48. The disconnect signal is produced for a port 48 and thus, the origin and location of the laser 304 used to send an optical signal through the opened fiber connection is known. The disconnect signal can then be automatically sent through a modem 306, telephone line 308 and another modem 310 to cause a modulator 312, usually associated with the laser 304 to reduce the intensity of the laser output and even entirely cut-off the beam. This description is illustrative only (modems may not be needed) and many variations can be used to in effect render the loose, active fiber connection harmless if that needs to be done.

In FIG. 9 a series of illustrative steps are shown in a routine 320 that can be used with the routine 210 in FIG. 7 to respond to an opened fiber connection. Starting with negative decision on line 253 from step 250 in FIG. 7, routine 320 can be employed as part of the alarm response.

At 322 a determination is made that a fiber connection has been opened and at 324 the particular active fiber port is identified to locate the source of the optical beam emanating from the loose or opened fiber connection. A disconnect signal is then sent out to the source at 326 and its intensity is reduced at 328, such as by disconnecting it or cutting power to it or by appropriate modulation.

A resumption of laser power through the active fiber port can be implemented by employing the negative decision line 261 from step 254 in FIG. 7 before implementing a return step 260. Thus, at 340 the patch panel system 300 detects that the previously opened optical port is again re-connected and sends a reconnect signal on line 302 at step 342. A return is then made at step 260.

Control over the physical connections of the optical fiber cables can also be implemented with a patch panel system 400 and circuit elements 402 as illustrated with reference to FIGS. 10 through 16.

Figure 10:
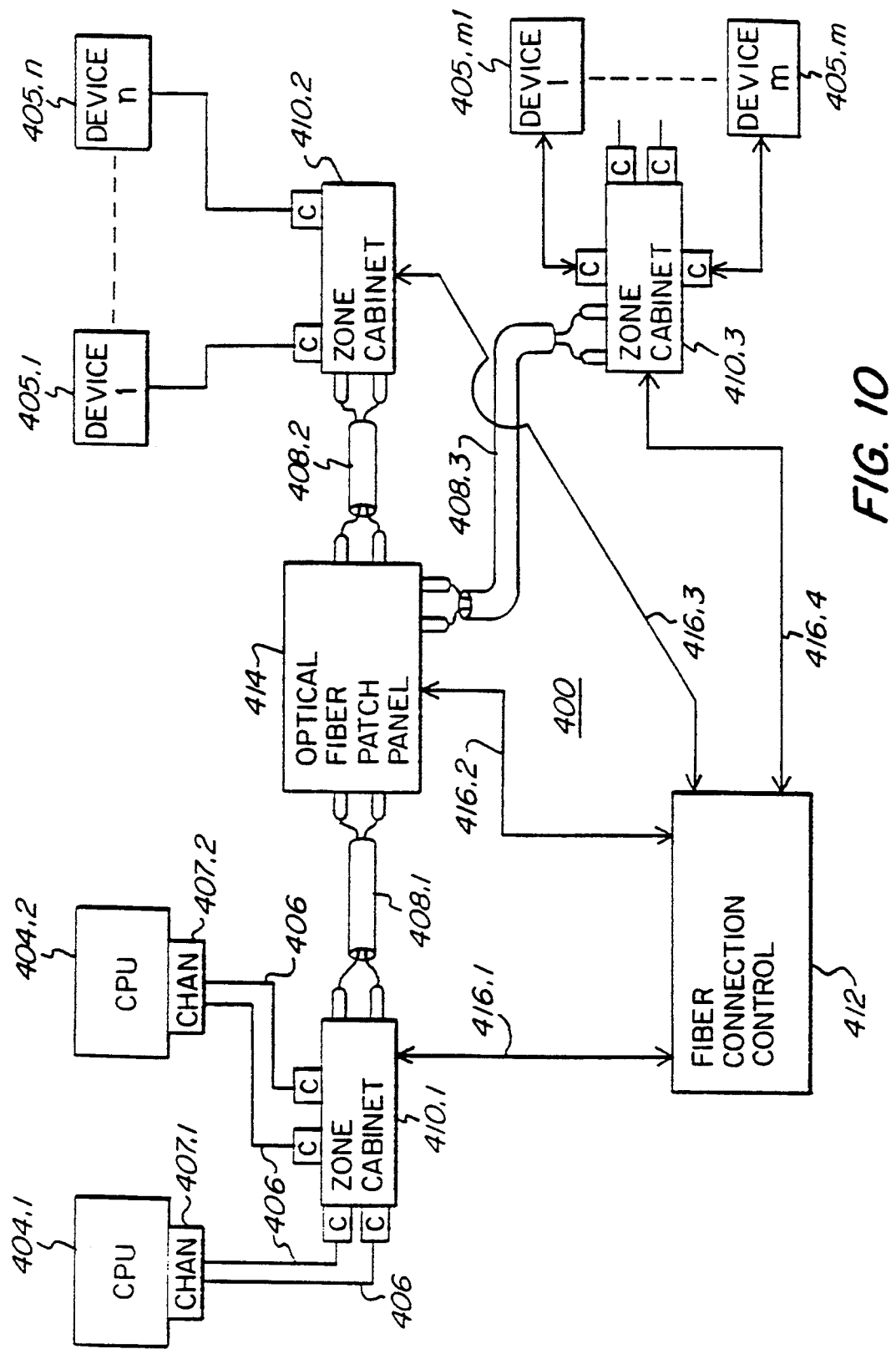
FIG. 10 is a block diagram view of another embodiment for an optical fiber patch panel system in accordance with the invention.

Thus as shown in FIG. 10 a patch panel system 400 for optical fiber cables is illustrated for a data processing center formed with CPU's 404 and peripheral devices 405 using optical fiber cables 406 and optical fiber trunk lines 408. The system 400 is shown connected between various input/output channels 407 of CPU's 404, which can be of the main frame type or such others as may be needed, and peripheral devices 405 through so-called zone cabinets 410, which can include appropriate cabinet managers 84 as described with reference to FIG. 2. The zone cabinets 410 may not always be needed and are shown to illustrate how complex a data center can be, particularly when a large number of optical fibers communicate with data center equipment. A control system 412 is used to derive a connection map of patch panel system 400 as well as of the CPU's 404 and devices 405 connected to a zone cabinet 410. Control system 412 is connected to the zone cabinets 410 and patch panel 414 by cables 416 which could be electrical conductors or optical fiber cables.

In optical fiber patch panel system 400 control over and information about the optical fiber interconnections is obtained in a manner similar to that described with reference to FIGS. 1 through 9. However, instead of relying upon the use of control wires within optical patch cables 420 to enable the control system 412 to derive a connection map, circuit elements 402 (see FIG. 11) are used inside electrical control connectors 422 to uniquely identify optical patch cable ends 424. The circuit elements are incorporated in electrical control connectors associated with optical fiber ports 48 to which the optical fiber cables 420 are connected. This chip inclusion is indicated in FIG. 10 with the letter "C" inside the blocks at cable ends.

During the installation of optical patch cables 420 in a manner similar to that described with reference to FIG. 7 the control system 412 learns an identification number associated with each cable optical fiber connector 430 and the ports 48 to which the cable 420 is connected. This information is stored within the control system 412 and can then be used during operation to detect and order changes and thus provide a continually updated connection map.

With reference to FIGS. 11 and 12 a connector end 424 for an optical fiber cable 420 is illustrated with greater detail. The cable end 424 is formed with an optical fiber connector 430 whose working end is the same as that described for fiber connector 88 in the previous Figures. An electrical connector connector 422 is mounted to the housing 432 of fiber connector 430. The control connector 422 has a plurality of terminals in the form of pins 94.1–94.10 similar to cable connector 90 and which connect to electrical control coupling or receptacle 52 in port 48 of a patch panel 44.

Internally of the housing 432 of control connector 422 is a circuit element 402 of the type made by the Dallas Semiconductor company and sold under its serial number DS2401. This circuit element delivers a unique 48 bit pulsed code on a single output line 440.1 in response to a polling signal on the line. The element is connected by data wire 440.1 and a ground wire 440.2 to terminals 94.6 and 94.7 respectively of control connector 422. Power for the circuit element is drawn from a drive circuit 444, see FIG. 14, connected to terminal 94.6 and thus to data wire 440.1. Circuit element 402 is sufficiently small to fit inside connector 410 and preferably is overmolded in place.

As shown in FIG. 12 optical fiber patch cable 420 has a connector identifying circuit element 402 located at each cable end 424. Conductors such as 92 used in the optical patch cable 56 shown in FIG. 4 are not required. In optical fiber cables such as 406 only one end has a control connector with a circuit element 402.

Figure 14:
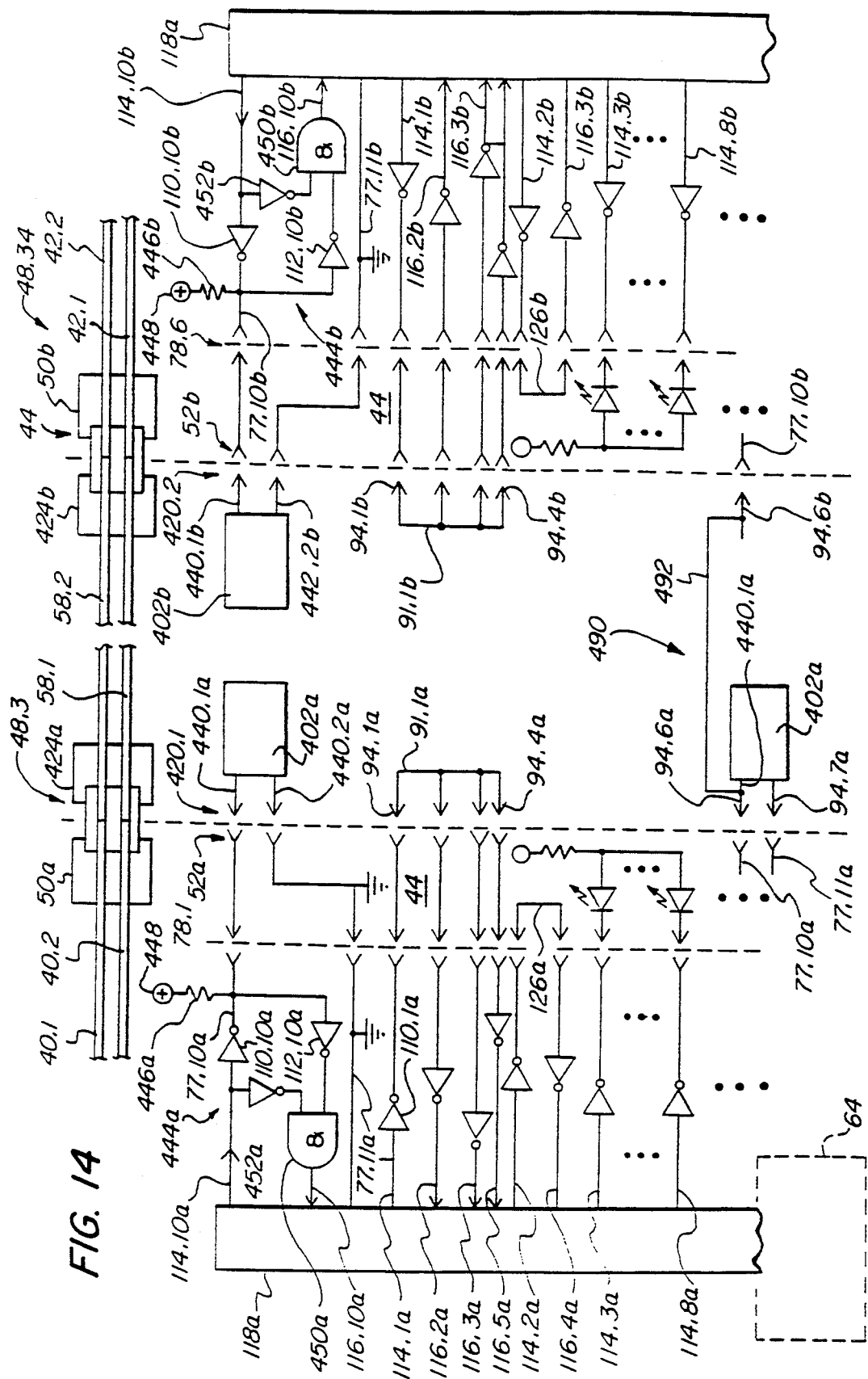
FIG. 14 is a block diagram schematic view of a part of another control system for compiling signals from and subsequently monitoring a patch panel system using either the optical fiber patch cable as illustrated in FIGS. 11 and 12 or the cable shown in FIG. 13.

FIG. 14 illustrates how a circuit element 402 is connected to a control system such as 64. A gate network 118a, similar to 118, produces on an output line 114.10a a polling signal to a driver 110.10a which is part of circuit 444a. Its output line 77.10 is coupled through group connector 78.1 on panel 44 to control coupling 52a and thence to polling wire 440.1a of circuit element 402a. A ground conductor 77.11 is shown connected to the ground wire 440.2a. A resistor 446a couples line 77.10 to a voltage source 448. Hence, in the absence of a signal from gate network 118a line 77.10 is biased high, as is needed for the idle mode of circuit element 402a.

When a polling or strobe pulsed signal occurs on line 114.10a, the output line 77.10a is activated and causes the circuit element 402a to respond with a pulsed code of some 64 bits long (8 bits for an error correction code, 48 bits for an identification number and 8 bits for a parity code). The pulsed code is applied on polling line 440.1a and passed through receiver 112.10a to an AND gate 450a whose output 116.10a is monitored by gate network 118a. The AND gate 450a is enabled by the state of the signal level present on output line 114.10a via an invertor 452a which also serves to prevent the original polling pulse from being passed back to the gate network 118a. Techniques for polling the circuit element 402 are well known and published by its manufacturer.

Other connections and circuits as shown in FIG. 5 are also applicable to the embodiment as illustrated in FIG. 14. Note, however, that the ability to identify the type of optical fiber connector at any one port 48 now needs an additional conductor 116.5a and associated receiver 112.5a. In addition the feedback conductors inside the control connector 422.1 need to engage another terminal 94.4a. Similar changes are needed within the other control connector 422.2.

With reference to FIG. 15 a technique 460 for operating the fiber connection control system 412 is illustrated. The process employs many of the steps described for the technique 180 shown in FIG. 7 and introduces changes primarily beginning with the installation of the patch cables 420 and optical fiber cables 406 which have a circuit element 402 mounted inside a control connector.

Hence, at 462 one initializing step involves defining for the system whether the optical patch cables 420 have a circuit element 402 in each control connector 422 or whether a single circuit element 402 is used as will be described with respect to FIG. 13 and 16.

At 464 the installation process continues with the initial activation of one or more port indicators to which an optical fiber cable is to be installed. At 466 a test is made whether a fiber cable connection is made at the indicated port. This test may involve the activation of a polling line such as 114.1a and looking for a return on any one of the lines such as 116.2a, 116.3a and 116.5a. Once a return is detected the identification of the port at which the optical fiber connection was made is stored at 468.

The identification of the circuit element 402 within the connected control connector is then polled at 470 by sending an appropriate signal on a line such as 114.10a. The response from the polled circuit element 402 is received by the signal processor within control system 64. The unique 48 bit code associated with that connector is detected and stored at 472 with the identification information of the port 48 where the connection was made.

In case that the port is designated for an optical fiber cable 406 with a single control connector 422, as tested at 474, then this information is associated with the data stored at 472. The particulars of the device 405 or cpu 404 to which the other end of the optical fiber cable 406 is connected is stored at 475. A jump is then made to step 476 for the next connection of an optical fiber cable.

In the event an optical patch cable is to be installed the test at 474 yields an affirmative response. At 478 the connection of the other end of the optical fiber patch cable is awaited. Once this connection has been detected the circuit element at the second end is polled and its identification number (IDN) is derived at 480. The IDN and its associated port information is stored at 482 and the optical fiber patch cable is identified by associating the respective IDN's at 484. A test is then made at 476 whether another optical fiber connection is to be made. If so, then a return is made to step 464 and the above process repeated. If not, then the program continues at 486.

The result of the technique 460 is that the signal processor within the control 64 can now produce a connection map of not only the optical fiber patch cables but also determine which cpu's and devices are in the system. Any changes in the connection system can be quickly implemented and substantial down times due inadvertent disconnections or other errors can be reduced.

As previously mentioned the optical patch cables 420 can be controlled by using a single circuit element in a cable. This illustrated in FIG. 14 at 490 and with the use of an optical patch cable 491 as shown in FIG. 13. One circuit element 402a is used within one of the control connectors 422a or 422b and polling wire 492 is included with the optical fibers to connect the active terminal 440.1a with a terminal 94.6b in the control connector 422 at the other end. In this manner system 64 can poll the circuit element 402 from opposite ends or from either ports 48 to which the optical fiber patch cable may be connected and a single IDN is used to identify the cable.

With reference to FIG. 16 the technique 460 can be used with the polling of the circuit elements in case of the use of an optical fiber cable such as 491. The initialization step is altered at 494 to indicate to the processor that the optical fiber patch cables use a single circuit element and thus a single IDN is used to identify that cable. This is implemented by setting the values for previously different IDN(a) and IDN(b) as being the same at 496. This is done directly after step 478 and is followed with a bypass of steps 478 through 484 by jumping to step 474.

Having thus described on optical fiber patch system in accordance with the invention, its advantages can be appreciated. Variations can be made from the described embodiment while remaining within the scope of the invention as set forth by the claims. For example, the electrical conductors 60 in a patch cable can be replaced by optical fiber cables with electrooptical couplings used at the panels 44 as may appear necessary. Similarly, optical fibers can be used for cables 76, and networks 106 can be formed on the subpanels 44.

What is claimed is:

1. An optical fiber connection control system, comprising:

panel means having a plurality of optical fiber ports for receiving connecting optical cables, said fiber ports being formed of an optical fiber coupling and a control coupling;

a plurality of optical cables, said optical cables having optical fibers terminating at fiber connectors selected to operatively engage optical fiber couplings in fiber ports of the panel means; said optical cables further having at ends thereof control connectors associated therewith and positioned to engage control couplings when optical fiber connectors are connected to optical fiber couplings at fiber ports; and means coupled to said control couplings and operative through said control connectors for deriving signals representative of which fiber couplings in fiber ports are connected to optical fiber connectors of optical cables.

2. The optical fiber connection control system as claimed in claim 1, wherein said signals deriving means comprises a plurality of circuits means for producing respectively unique identification signals in response to polling signals, a said circuit means being located in control connectors of optical cables;

means for generating polling signals associated with respective fiber ports and applying the polling signals through control couplings at fiber ports to the circuit means; and means responsive to identification signals from circuit means for respectively associating the identification signals with fiber ports.

3. The optical fiber connection control system as claimed in claim 2, wherein said optical cables have ends with a said circuit means at one end of the optical cable; said optical cables having a polling wire extending from a control connector at the other end of optical cables to said circuit means at said one end.

4. The optical fiber connection control system as claimed in claim 2 wherein said optical cables have ends with a control connector at each end and with a said circuit means in each control connector.

5. The optical fiber connection control system as claimed in claim 1 wherein said signal deriving means includes:

control lines within optical cables, said control lines being connected to terminals of control connectors at each end of said optical cables; and wherein said signals deriving means is coupled to said control lines.

6. The optical fiber connection control as claimed in claim 1 and further including:

means for generating first signals representative of a characteristic of said fiber connectors.

7. The optical fiber connection control as claimed in claim 6 wherein said means for generating said first signals includes:

means within said control connectors for producing code signals representative of the characteristic of said fiber connectors.

8. The optical fiber connection control as claimed in claim 7 wherein said means for producing code signals includes conductors selectively interconnecting terminals of control connectors.

9. The optical fiber connection control as claimed in claim 1 and further including:

means responsive to said derived signals for producing a connection map of optical fiber ports and optical cables connected thereto.

10. An optical fiber patch panel system, comprising:

a panel having a plurality of optical fiber ports, said fiber ports being formed of an optical fiber coupling and a control coupling;

a plurality of optical cables, said optical cables having optical fibers terminating at fiber connectors selected to operatively engage fiber couplings in fiber ports of the panel; said cables further having control lines terminating at control connectors selected to operatively engage control couplings at fiber ports of the panel;

means coupled to said control couplings for establishing a signal loop that extends through a pair of fiber ports and an optical cable connected to the pair of fiber ports;

means for sending a signal through said signal loop and detecting said signal after passage through the signal loop to monitor the connections made by the optical cable at the pair of fiber ports.

11. The optical fiber panel system as claimed in claim 10 wherein said sending means comprises:

means for repetitively sending signals through said loop to monitor connections made by optical cables; and means for determining when a said connection is disconnected and provide an indication when disconnection is unauthorized.

12. The optical fiber panel system as claimed in claim 10 and further including:

means for determining when a said connection of an optical cable is disconnected and producing a disconnect signal indicative thereof.

13. The optical fiber panel system as claimed in claim 12 and further including:

means responsive to said disconnect signal for causing a reduction of the intensity of optical light emanating from the disconnected optical cable.

14. The optical fiber panel system as claimed in claim 10 wherein said sending and detecting means includes:

a central processor unit having a plurality of outputs and inputs;

means for coupling the outputs and inputs of the central processor unit to a plurality of control couplings so as to enable monitoring of optical fiber couplings associated therewith.

15. The optical fiber panel system as claimed in claim 10 wherein said panel is formed of a plurality of subpanels with a group of ports located on the subpanels;
   means for establishing a second signal loop that extends through a panel control coupling;
   group connectors mounted on the subpanels;
   means for establishing second signal loops which extend through group connectors and return through the group connectors; and
   means for sending signals through said second signal loops to derive which fiber ports are actively connected as part of the panel system.

16. An optical fiber connection monitor comprising:
   an optical fiber having at one end an optical connector, said optical fiber connector having associated therewith a control connector, said control connector including a control signal loop;
   an optical fiber coupling selected to make operative optical contact with the optical fiber connector;
   a control coupling associated with the optical fiber coupling and selected to make operative contact with the control connector and its control signal loop; and
   means for sending a signal through the control coupling, the control connector and its control signal loop to monitor the operative contact between the optical fiber coupling and optical fiber connector.

17. The optical fiber connection monitor as claimed in claim 16 wherein said control connector is integrally mounted with the optical fiber connector so that when the optical fiber connector makes or breaks operative contact with the optical fiber coupling, the control connector respectively makes or breaks signal continuity through said control signal loop.

18. The optical fiber connection monitor as claimed in claim 17 wherein said means for sending a signal includes means for generating a disconnection signal when said continuity through the control signal loop is interrupted.

19. The optical fiber connection monitor as claimed in claim 18 and further including:
   means responsive to the disconnection signal for causing a reduction in the intensity of an optical beam passing through the optical fiber so as to reduce physical danger from an optical beam emanating from a loose optical fiber connector.

20. An optical fiber patch panel system, comprising:
   a connector panel having a plurality of optical fiber ports, said fiber ports being formed of an optical fiber coupling and an associated electrical coupling;
   a plurality of optical patch cables, each cable having an optical fiber and at least one electrical conductor, and having at each cable end an optical fiber connector and an associated electrical connector which are respectively connectable to an optical fiber coupling and its associated electrical coupling; each cable, upon connection to optical fiber ports, completing the formation of at least one control signal loop which includes the electrical coupling and electrical connectors at the ports to which the optical patch cable is connected; and
   means coupled to the electrical couplings of the optical fiber ports for sending and detecting control signals passing through each control signal loop for determining optical fiber connections made by optical patch cables connected to couplings at the connector panel.

21. The optical fiber patch panel system as claimed in claim 20 wherein said optical patch cable optical fiber connector and associated electrical connector are integrally mounted to each other in a manner so that, when said optical fiber connector operatively engages said optical fiber coupling, said electrical coupling and electrical connector also operatively engage each other.

22. The optical fiber patch panel system as claimed in claim 21 wherein said electrical connectors have terminals with selected terminals being interconnected to each other within said connector so as to provide, on said selected terminals, a predetermined connection code that identifies a characteristic related to the optical patch cable of which the electrical connector is a part.

23. The optical fiber patch panel system as claimed in claim 22 wherein said connector panel has a plurality of indicators respectively associated and placed alongside the ports; and
   means for selectively activating an indicator associated with a port to visually identify said latter port.

24. The optical fiber patch panel system as claimed in claim 23 and further including:
   indicators respectively mounted to said cable connectors; and
   means for activating indicators on said cable connectors through electrical couplings connected to electrical cable connectors.

25. The optical fiber patch panel system as claimed in claim 20 wherein said optical patch cables include optical fiber patch jumpers having a rigid U-shaped construction terminating at said cable connectors.

26. The optical fiber patch panel system as claimed in claim 20 and further including:
   means on said connector panel for enabling generation of a first return signal to said determining means as representative of activation of said connector panel as part of the patch panel system.

27. The optical fiber patch panel system as claimed in claim 26 wherein said means for generating said first return signal comprises a first conductor loop extending from the optical fiber connections determining means to said patch panel and back to said optical fiber connections determining means.

28. The optical fiber patch panel system as claimed in claim 27 wherein a plurality of said optical fiber ports are arranged in at least one group, an electrical group coupling mounted to the connector panel and having terminals connected to terminals in the electrical couplings, said electrical group coupling having a pair of terminals which are effectively connected together as part of the first conductor loop;
   a group cable of electrical conductors having a group connector at one end to operatively couple the optical fiber connections determining means to said connector panel, with first and second conductors in the group cable being coupled through the group connector to said pair of effectively connected pair of terminals at the group coupling.

29. The optical fiber patch panel system as claimed in claim 20 wherein said means for determining optical fiber connections comprises:
   means for testing for ports active in the patch panel system; and
   means for monitoring the active ports to determine changes in connections of connected optical patch cables.

30. The optical fiber patch panel system as claimed in claim 23 wherein said means for determining optical fiber connections at a connector panel.

31. An optical fiber patch cable for use with an optical patch panel having optical fiber couplings, comprising:
   a patch cable having at least one optical fiber and at least one electrical conductor, said patch cable having at its ends optical fiber connectors operatively connected to the optical fiber and electrical control connectors that are operatively connected to the electrical conductor and are so mounted to the optical fiber connectors as to operatively engage corresponding control couplings when said optical fiber connectors operatively engage corresponding optical couplings; selected terminals in said electrical connectors being interconnected so as to form control signal loops.

32. The optical fiber patch cable as claimed in claim 31 wherein said electrical connectors have terminals, with selected terminals being interconnected to each other within the connectors so as to provide, on said selected terminals, a predetermined connection code that identifies a characteristic related to the optical patch cable.

33. A method for controlling optical fiber connections, comprising the steps of:
   connecting optical fiber cables to ports in a panel;
   transmitting signals to the panel to derive indications from the ports to which optical fiber cables are connected; and
   deriving, from the indications, a connection map of the optical fiber cables and the ports.

34. The method for controlling optical fiber cables connections as claimed in claim 35 wherein the transmitting step further comprises the steps of:
   transmitting a said signal through respective ports to connectors at ends of optical fiber cables connected thereto; and
   detecting said indications returned from the connectors.

35. The method for controlling optical fiber cables connections as claimed in claim 34 wherein said detecting step comprises the step of determining, from said indications returned from connectors, unique code numbers associated with respective ports to which the connectors are coupled.

36. The method for controlling optical fiber cable connections as claimed in claim 33 and further comprising the steps of:
   continually monitoring the ports to detect changes in the connection of an optical fiber cable to a port; and
   generating a signal representative of a change in said connection when such change occurs.

37. The method for controlling optical fiber cable connections as claimed in claim 33 and further comprising the step of:
   storing, with selected indications, identifying information of equipment connected by optical fiber cables to the ports.

38. The method for controlling optical fiber connections as claimed in claim 33 wherein said connecting step further comprises the step of successively generating signals to visually identify individual ports to which optical fiber cables are to be connected.

39. The method for controlling optical fiber connections as claimed in claim 38 and further comprising the step of:
   generating a signal to visually identify an individual port from which an optical fiber cable is to be disconnected.

40. A method for controlling optical fiber patch cables used to interconnect ports arranged in groups in a patch panel, comprising the steps of:
   forming optical fiber patch cables having optical fiber connectors and associated control connectors at ends thereof;
   connecting optical fiber patch cables to ports in the patch panel wherein the ports have optical fiber couplings which operatively engage optical fiber connectors and control couplings which operatively engage control connectors;
   sending signals through control couplings to control connectors to derive return signals indicative of the presence of connected optical fiber cables at respective ports; and
   deriving from said return signals a connection map of interconnected optical fiber couplings in the panel.

41. The method for controlling optical fiber patch cables as claimed in claim 40 and further comprising the step of:
   sending signals through group connectors associated with respective groups of ports to derive second return signals representative of whether a group of ports is an operative part of the patch panel.

42. The method for controlling optical fiber patch cables as claimed in claim 40 and further comprising:
   sending signals through control couplings to control connectors and deriving return signals representative of characteristics of optical fiber connectors engaged with optical fiber couplings.

43. The method for controlling optical fiber patch cables as claimed in claim 41 and further comprising the step of:
   prior to said connecting step, visually illuminating a light adjacent ports to be connected by an optical fiber patch cable.

* * * * *